(12) United States Patent
Park et al.

(10) Patent No.: US 8,589,881 B2
(45) Date of Patent: Nov. 19, 2013

(54) WEB-BASED SOFTWARE DEBUGGING APPARATUS AND METHOD FOR REMOTE DEBUGGING

(75) Inventors: Hong Seong Park, Seoul (KR); Chang Ho Hong, Gangwon-do (KR); Jeong Seok Kang, Jeollabuk-do (KR); Hyeong Seob Choi, Gangwon-do (KR); Sang Woo Maeng, Gangwon-do (KR)

(73) Assignee: KNU-Industry Cooperation Foundation, Gangwon (KR)

( * ) Notice: Subject to any disclaimer, the term of this patent is extended or adjusted under 35 U.S.C. 154(b) by 727 days.

(21) Appl. No.: 12/667,234

(22) PCT Filed: Aug. 20, 2009

(86) PCT No.: PCT/KR2009/004627
§ 371 (c)(1),
(2), (4) Date: Dec. 30, 2009

(87) PCT Pub. No.: WO2011/016595
PCT Pub. Date: Feb. 10, 2011

(65) Prior Publication Data
US 2011/0252404 A1    Oct. 13, 2011

(30) Foreign Application Priority Data
Aug. 3, 2009    (KR) .......................... 10-2009-0071264

(51) Int. Cl.
*G06F 15/16* (2006.01)
*G06F 11/00* (2006.01)
*G06F 11/22* (2006.01)
*G06F 17/50* (2006.01)
*G06F 9/44* (2006.01)

(52) U.S. Cl.
USPC ............. 717/124; 709/217; 714/31; 716/136; 717/116; 717/125; 717/126; 717/127

(58) Field of Classification Search
None
See application file for complete search history.

(56) References Cited

U.S. PATENT DOCUMENTS 5,819,093 A * 10/1998 Davidson et al. ............. 717/126
6,042,614 A *  3/2000 Davidson et al. ............. 717/116

(Continued)

FOREIGN PATENT DOCUMENTS

| KR | 1020060035068 | 4/2006 |
| KR | 10-2006-0094861 A | 8/2006 |
| KR | 10-0619942 B1 | 9/2006 |

OTHER PUBLICATIONS

Ashu Guru et al., Web-based simulation management: a web-based interface for storing and executing simulation models, 2000, [Retrieved on Sep. 9, 2013]. Retrieved from the internet: <URL: http://dl.acm.org/citation.cfm?id=510643> 5 Pages (1810-1814).*

(Continued)

*Primary Examiner* — Don Wong
*Assistant Examiner* — Anibal Rivera
(74) *Attorney, Agent, or Firm* — Soroker Agmon (57) ABSTRACT

Provided is a web-based software debugging apparatus and method for remote debugging. The web-based software debugging apparatus may include: a web interface to provide a web browser that enables a user to make a request for a debugging service for software performed in a remote target system, and to verify a debugging result of the software; a debugger client to receive the debugging service request for the software via the web interface, and to provide the debugging result to the web interface; and a debugger server to receive the debugging service request from the debugger client, and to transmit the debugging result to the debugger client after debugging the software through a connection to the target system according to the debugging service request.

11 Claims, 5 Drawing Sheets

(56) References Cited

U.S. PATENT DOCUMENTS

| | | | | |
|---|---|---|---|---|
| 6,119,247 | A * | 9/2000 | House et al. | 717/126 |
| 6,263,456 | B1 * | 7/2001 | Boxall et al. | 714/31 |
| 7,634,760 | B1 * | 12/2009 | Gumtow et al. | 717/125 |
| 7,827,510 | B1 * | 11/2010 | Schubert et al. | 716/136 |
| 7,873,872 | B1 * | 1/2011 | Shillington et al. | 717/124 |
| 7,873,875 | B2 * | 1/2011 | Sato et al. | 714/45 |
| 2001/0004766 | A1 * | 6/2001 | Koyama | 717/4 |
| 2002/0174415 | A1 * | 11/2002 | Hines | 717/127 |
| 2005/0050159 | A1 * | 3/2005 | Suraski | 709/217 |
| 2007/0143301 | A1 * | 6/2007 | Tran | 707/10 |
| 2008/0148237 | A1 * | 6/2008 | Jiang et al. | 717/124 |
| 2008/0295077 | A1 * | 11/2008 | Sengupta et al. | 717/124 |

OTHER PUBLICATIONS

Neophytos Neophytou et al., Net-dbx: A Web-Based Debugger of MPI Programs Over Low-Bandwidth Lines, 2001, [Retrieved on Sep. 9, 2013]. Retrieved from the internet: <URL: http://ieeexplore.ieee.org/stamp/stamp.jsp?tp=&arnumber=954636> 10 Pages (986-995).*

International Search report issued by the Korean Intellectual Property Office on Aug. 27, 2010 for PCT Patent Application No. PCT/KR2009/004627.

* cited by examiner

| PacketType (1byte) | CommandID (4byte) | ProcessID (4byte) | Option (80byte) | 510 |
| --- | --- | --- | --- | --- |

| PacketType (1byte) | CommandID (4byte) | ProcessID (4byte) | StandardError (80byte) | 520 |
| --- | --- | --- | --- | --- |

| PacketType (1byte) | CommandID (4byte) | ProcessID (4byte) | StandardOutput (80byte) | 530 |
| --- | --- | --- | --- | --- |

PacketType 0 : Command
PacketType 1 : StandardError
Packet 2 : StandardOutput

WEB-BASED SOFTWARE DEBUGGING APPARATUS AND METHOD FOR REMOTE DEBUGGING

TECHNICAL FIELD

Embodiments of the present invention relate to a debugging technology that may debug remote software using an interface of a web browser.

BACKGROUND ART

Generally, a debugger indicates an instrument that is used for a program development process. The debugger functions to execute a program, to examine and change a status of the program, and to set up a breakpoint. Through this, the debugger may easily retrieve a syntactic error or a semantic error included in the program. In particular, the semantic error of the program corresponds to a logical error caused by a developer for the program development process. The program may need to be tracked to find the semantic error.

The program tracking function indicates a function of checking intermediate results while executing the program based on a line or a command unit. The program tracking function may be one of the most important functions provided by the debugger. Specifically, the debugger may execute the program based on a line unit of a source code. In this case, the debugger enables a Central Processing Unit (CPU) of a computer to execute a single line and to wait for a next command of the developer.

A program debugging process using the debugger may include four operations, for example, an operation of recognizing an error of a program, an operation of detecting a location of the error, an operation of detecting a cause of the error, and an operation of correcting the error. For this, the debugger may provide basic functions such as a program execution function, a program tracking function, a breakpoint setup function, a parameter test function, a parameter change function, a current location report function, and the like A compiler may generate debugging information to describe a source file to be debugged to the debugger, so that the debugger may perform a desired function. The debugging information generally may be divided into information associated with a structure of the program and information associated with an internal symbol of the program. Information associated with the structure of the program may include a source file, line information, a module name, a module range, a name and a path of the source file, block information, a procedure name and type, and the like. Information associated with the internal symbol of the program may include a symbol mode, information of each mode, a symbol address, and the like.

Remote software may be debugged using a GNU Source-Level Debugger (GDB) and a GDB server with respect to basic functions used for general source code debugging. The basic functions may include, for example, a program execution control function, a memory reference and change function, a register reference and change function, a breakpoint setup and release function, and the like.

The GDB may provide many functions of tracking an execution of a computer program to correct the computer program. A user may monitor or change values of internal parameters of the computer program, and may also call a function independently from a general program execution process.

Also, the GDB may support a remote mode used when debugging an embedded system. Remote debugging indicates that the GDB operates on a single machine and a program to be debugged operates on another machine. The GDB may communicate with a remote stub being aware of a GDB protocol, using a serial port or a Transmission Control Protocol/Internet Protocol (TCP/IP). A remote debugging mode may be used in a KGDB that is a source-level debugger used for a Linux kernel. When using the KGDB, a kernel developer may debug a kernel in a similar way as a general application program. The KGDB may insert a breakpoint into a kernel code, and may execute a code by each single step or observe a parameter value. A processor including a hardware debugging register may set up a watchpoint to thereby set up a breakpoint when a particular memory address is accessed or is executed. The KGDB may need another machine that may be connected, using a serial cable or Ethernet, to a machine to be debugged. FreeBSD may perform debugging using Firewire Direct Memory Access (DMA).

However, to perform remote debugging using the GDB and the GDB server, a host computer where the GDB operates may need to be in an environment where the GDB is operable. Accordingly, in an aspect that an environment setup for the host computer is required prior to performing debugging, it may be difficult to effectively perform debugging. In addition, a spatial constraint may occur in performing debugging. When the GDB debugs a target system, a Command Line Interface (CLI) may be generally provided as a user interface. The CLI may cause an inconvenience for unskilled users.

DISCLOSURE OF INVENTION

Technical Goals

An aspect of the present invention provides a web-based software debugging apparatus and method that may overcome a spatial constraint of a user or a dependent development environment when debugging remote software.

Technical Solutions

According to an aspect of the present invention, there is provided a web-based software debugging apparatus, including: a web interface to provide a web browser that enables a user to make a request for a debugging service for software performed in a remote target system, and to verify a debugging result of the software; a debugger client to receive the debugging service request for the software via the web interface, and to provide the debugging result to the web interface; and a debugger server to receive the debugging service request from the debugger client, and to transmit the debugging result to the debugger client after debugging the software through a connection to the target system according to the debugging service request.

The debugger server may set up a communication path with the target system using a serial communication or a Transmission Control Protocol/Internet Protocol (TCP/IP) communication.

The debugger server may include: a server manager to receive the debugging service request from the debugger client, and to receive the debugging result from the target system; an information converter manager to convert the debugging service request and the debugging result to a format of a command used in a GNU Source-Level Debugger (GDB); and a process controller to drive the GDB for a general control associated with debugging of the software according to the converted command.

According to another aspect of the present invention, there is provided a web-based software debugging method of a debugging apparatus including a web interface, a debugger client, and a debugger server, the method including: receiving, by the web interface, a debugging service request of a user for software performed in a remote target system via a web browser; transmitting, by the debugger client, the debugging service request to the debugger server; and debugging, by the debugger server, the software through a connection to the target system according to the debugging service request.

The transmitting of the debugging service request may include: requesting the debugger server for a connection for a debugging service when the web browser is executed; requesting the debugger server for the connection to the target system when a response packet for a connection success for the debugging service is received from the debugger server; and transmitting the debugging service request to the debugger server when a response packet for a connection success to the target system is received from the debugger server.

The debugging of the software may include transmitting a debugging service request message to the target system to drive a GDB according to the debugging service request. The target system may debug the software according to driving of the GDB and then transmit a debugging result of the software to the debugger server using a standard error and a standard output.

Effect of the Invention

According to embodiments of the present invention, when debugging remote software of a target system, for example, an embedded system and a personal system, using a host computer, it is possible to maintain advantages of remote debugging according to a resource insufficiency of the target system through a connection to a web interface, and to enhance a convenience for a software developer and a tester.

Also, according to embodiments of the present invention, a user may access a host system via a web interface and thus may debug remote software through a connection to a target system without restriction on the user's development environment. Specifically, since the remote software debugging may be performed using a web, it is possible to enhance an accuracy and reliability of developed software.

BEST MODE FOR CARRYING OUT THE INVENTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 1:
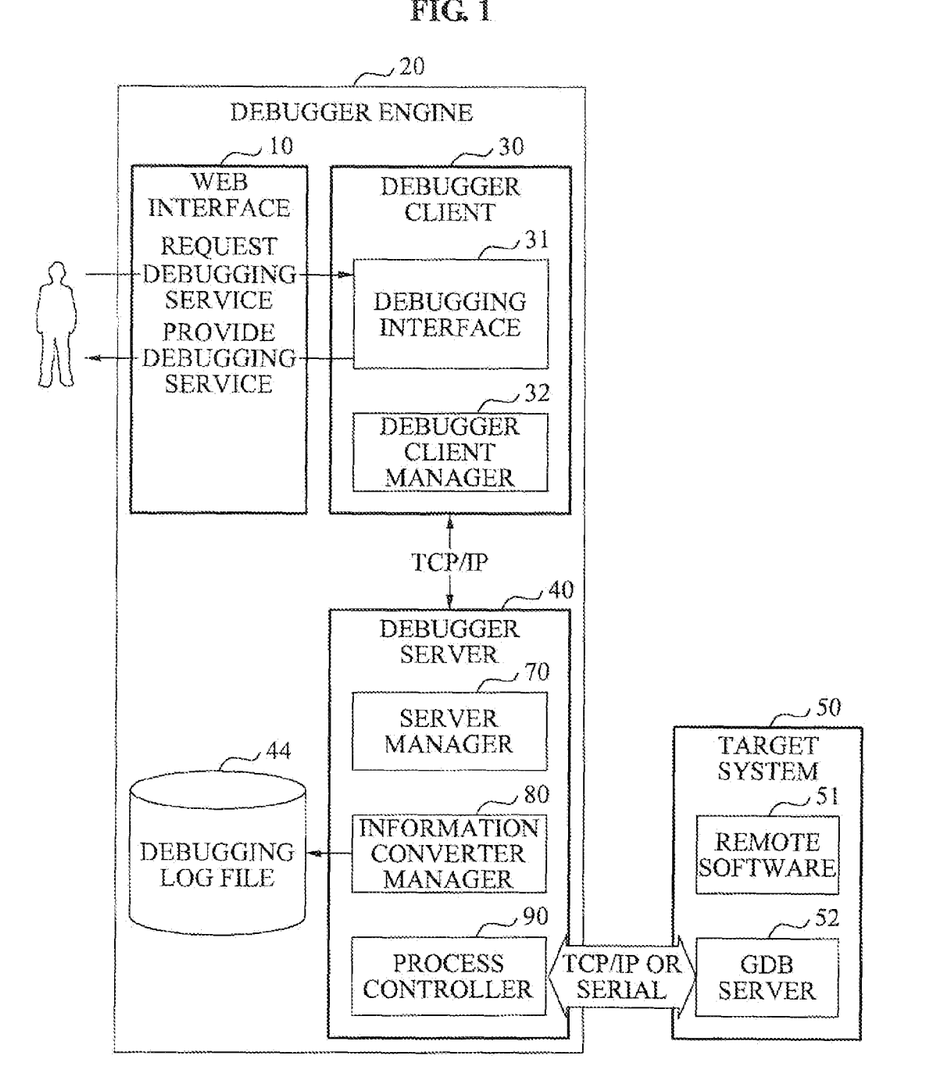
FIG. 1 is a block diagram illustrating a structure of a web-based software debugging apparatus for remote debugging according to an embodiment of the present invention.

FIG. 1 is a block diagram illustrating a structure of a web-based software debugging apparatus for remote debugging according to an embodiment of the present invention.

Referring to FIG. 1, the web-based software debugging apparatus may include a debugger engine 20 and a target system 50. The debugger engine 20 may include a web interface 10, a debugger client 30, and a debugger server 40. Remote software 51 to be debugged may operate in the target system 50.

The web interface 10 may convert, to a web browser interface, a debugging result for the remote software 51 that is collected by a GNU Source-Level Debugger (GDB) being operated at a host computer. Accordingly, instead of debugging at the host computer the remote software 51 via a command line interface (CLI) that is an interface of the GDB, a web browser may access the host computer using an identifier (ID) and a password to control the GDB of the host computer using a web, and to debug the remote software 51.

The debugger client 30 may transfer, to the debugger server 40, information concerning an execution of the GDB and a connection of a GDB server 52 that is obtained via the web interface 10, and a debugging service request for the remote software 51. A host system or the target system 50 may convert, to the web interface 10, a response result with respect to the debugging service request. For this, the debugger client 30 may include a debugging interface 31 to manage an information exchange with the web interface 10, and a debugger client manager 32 to manage general control of the debugger client 30 such as an establishment of a connection to the debugger server 40, a user information management, and the like. The debugger client manager 32 may set up a communication path with the debugger server 40 using a serial communication or a Transmission Control Protocol/Internet Protocol (TCP/IP), for example, Ethernet.

The debugger server 40 may be connected with the debugger client 30 to receive the debugging service request from the debugger client 30 and then may debug the remote software 51 of the target system 50 and operate a controllable GDB and transmit a debugging service result to the debugger client 30. A configuration of the debugger server 40 will be described in detail with reference to FIG. 2.

The target system 50 indicates a system where the remote software 51 corresponding to an actual debugging target operates. In the target system 50, the GDB server 52 may operate and be connected to the GDB of the host computer using the serial communication or the TCP/IP communication.

Figure 2:
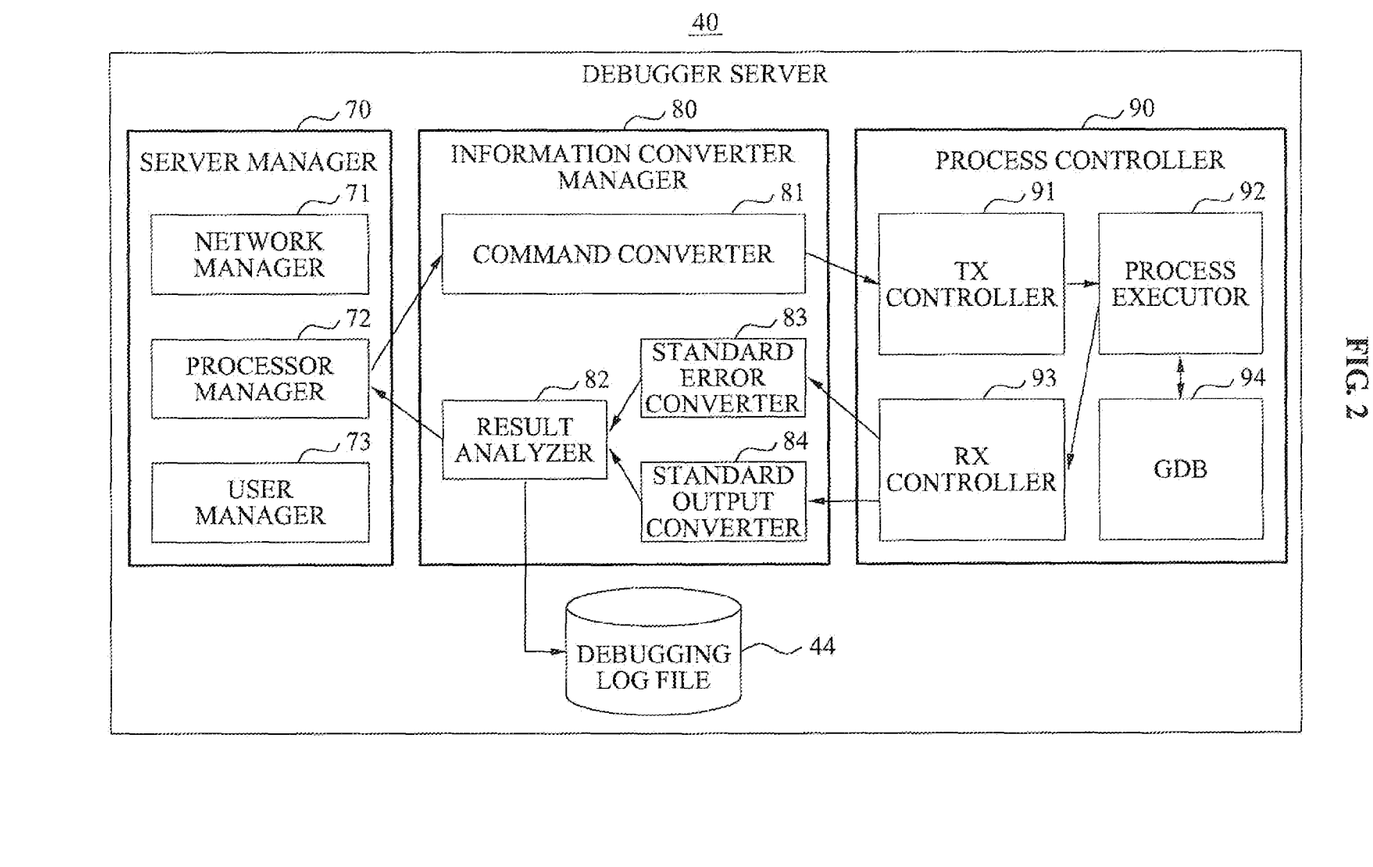
FIG. 2 is a block diagram illustrating a configuration of a debugger server included in a debugger engine of FIG. 1.

FIG. 2 is a block diagram illustrating the configuration of the debugger server 40 included in the debugger engine 20 of FIG. 1.

Referring to FIG. 2, the debugger server 40 may include a server manager 70, an information converter manager 80, and a process controller 90.

The server manager 70 may include a network manager 71, a processor manager 72, and a user manager 73. The network manager 71 functions to transmit a debugging command message such as a program execution control function, a memory reference and change function, a register reference and change function, a breakpoint setup and release function, and the like, using a socket communication, and may receive a debugging result message. The processor manager 72 functions to process information about a GDB execution, a current state of a process, a software debugging result obtained via the process, and service request information of a user that is transmitted from the debugger client 30. The user manager 73 functions to manage information of an accessing user.

The information converter manager 80 may include a command converter 81, a standard error converter 83, a standard output converter 84, and a result analyzer 82. The command converter 81 functions to receive a request message that is received by the server manager 70 from the debugger client 30, to substantially execute the GDB, and to convert the request message to a format of a command that is used in a GDB prompt. The standard error converter 83 and the standard output converter 84 may receive and process the debugging result as a standard output and a standard error. The debugging result may be obtained by debugging, at the GDB, the remote software 51. The result analyzer 82 may store a record regarding the processed debugging result in a debugging log file 44 and then transfer the debugging result to the processor manager 72. In this instance, the processor manager 72 receiving the debugging result from the result analyzer 82 may transfer the debugging result to the debugger client 30 having requested the debugging service, using information of the network manager 71 and the user manager 73.

The process controller 90 may receive a converted GDB prompt command from the command converter 81 via a transmission (Tx) controller 91, and transfer the received GDB prompt command to a process executor 92. The process executor 92 may analyze a message type of the transferred GDB prompt command and request a GDB 94 to transfer a debugging command for the target system 50 according to the analyzed message type. In addition, a reception (Rx) controller 93 may transfer the analyzed message type to the information converter manager 80.

According to an embodiment of the present invention, it is possible to provide a user with a web interface-based remote software debugging service using a serial communication or a TCP/IP communication with a target system. Also, a debugger engine may be logically divided into a debugger client and a debugger server. Through this, it is possible to process responses from a plurality of clients with respect to a connection to the debugger server and the target system, and a service request, and to provide an opportunity capable of physically separating the debugger client and the debugger server.

Figure 3:
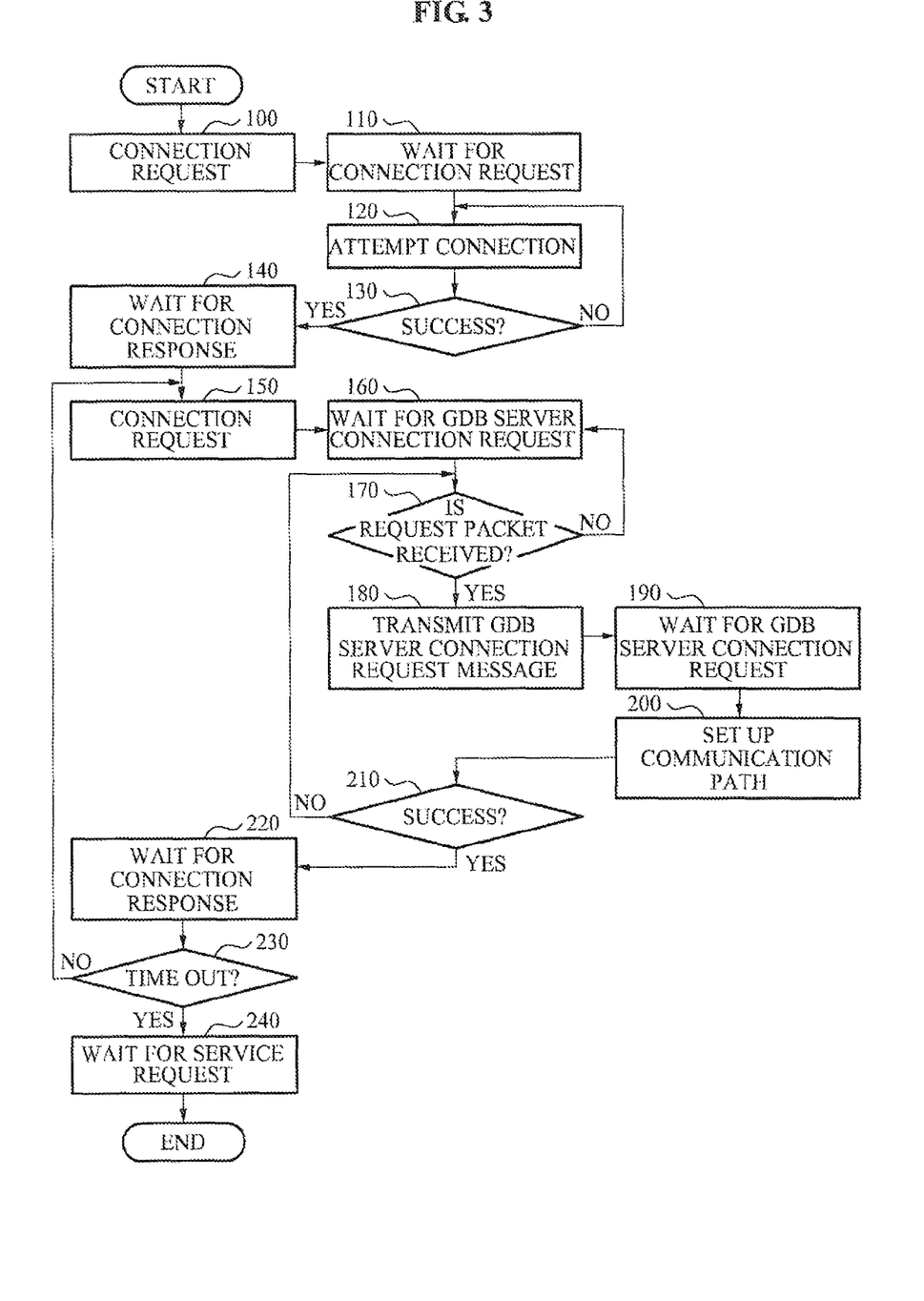
FIG. 3 is a flowchart illustrating a process of executing a host system and establishing a connection to a target system in a web-based software debugging method according to an embodiment of the present invention.

FIG. 3 is a flowchart illustrating a process of executing a host system and establishing a connection to a target system in a web-based software debugging method according to an embodiment of the present invention. Here, the web-based software debugging method may be performed by the web-based debugging apparatus constructed as above.

Hereinafter, the process of being executed on the host system and establishing the connection to the target system will be described with reference to FIG. 3.

A debugger client may wait for a connection request for a debugging service. When a debugging service request is received from a user via a web interface, the debugger client may request a debugger server for the connection in operation 100. In operation 110, the debugger server may wait for the connection request from the debugger client. When the connection request is received from the debugger client, the debugger server may attempt a connection to obtain a GDP process of a host computer in operation 120. When the connection succeeds in operation 130, the debugger server may transmit a connection success packet to the debugger client that is waiting for a connection response from the debugger server in operation 140. Conversely, when the connection fails in operation 130, the debugger server may stay in a connection request waiting state until a subsequent connection request is received. When the connection success response packet is received from the debugger server, the debugger client may transmit a target system connection request packet to the debugger server in operation 150. After transmitting a GDB process connection success response message of the host computer, the debugger server may wait for a GDB server connection request in operation 160. When the target system connection request packet is received from the debugger client in operation 170, the debugger server may transmit a GDB server connection request message to the target system in operation 180. In operation 190, the target system may wait for the GDB server connection request. When the GDB server connection request is received, the target system may attempt to set up a communication path in operation 200, and transmit a result message to the debugger server. When the setup of the communication path succeeds in operation 210, the debugger server may transmit a communication path setup success message to the debugger client. Conversely, when the setup of the communication path fails in operation 210, the debugger server may return to operation 160. The debugger client may wait for a connection response in operation 220. When the communication path setup success message is received, the debugger client may inform the user using a web interface that a connection setup of the web-based software debugger for remote debugging is completed. When a predetermined period of time is elapsed in operation 230, the debugger client may wait for a debugging service request from the user again in operation 240.

Figure 4:
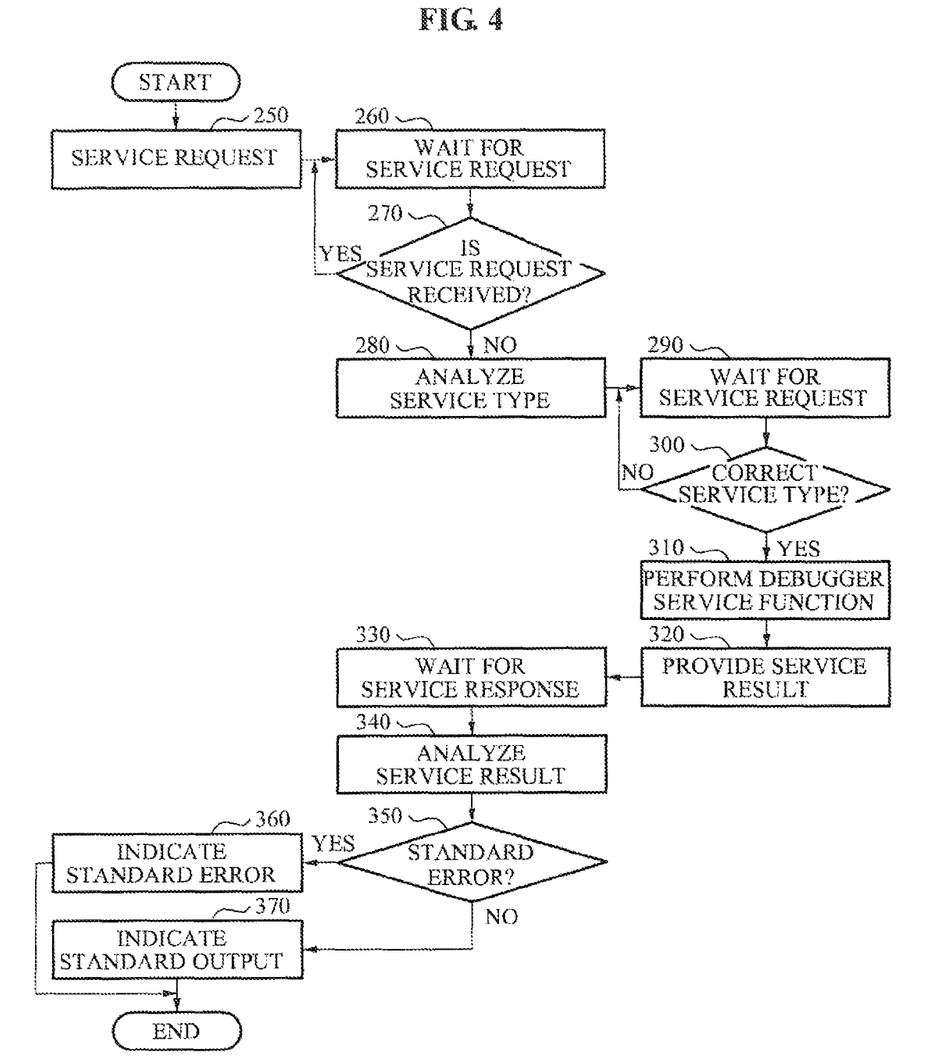
FIG. 4 is a flowchart illustrating a process for a debugging service request and response in a web-based software debugging method according to an embodiment of the present invention.

FIG. 4 is a flowchart illustrating a process for a debugging service request and response in a web-based software debugging method according to an embodiment of the present invention. Here, the web-based software debugging method may be performed by the web-based debugging apparatus constructed as above.

Hereinafter, the process for the debugging service request and response will be described with reference to FIG. 4.

In operation 250, a debugger client may request a debugger server for a debugging service according to a debugging service request from a user. In operation 260, the debugger server may wait for a service request from the debugger client. When the service request is received in operation 270, the debugger server may analyze a service type in operation 280, and transmit a service request message to a target system. In operation 290, the target system may wait for a service request from the debugger server. When a correct service type is received in operation 300, the target system may perform a function of the requested service in operation 310 and transmit a service result to the debugger server in operation 320. The debugger server may wait for a service response from the target system in operation 330. When the service result is received from the target system, the debugger server may analyze a service type based on the received service result in operation 340. The debugger server may classify the service type into a standard error or a standard output based on an analysis result of the service type of operation 350, and transmit the classified debugging result to the debugger client. In operations 360 and 370, the debugger client may process the received debugging result separately for the standard error and the standard output, and inform the user about the result using a web interface.

Figure 5:
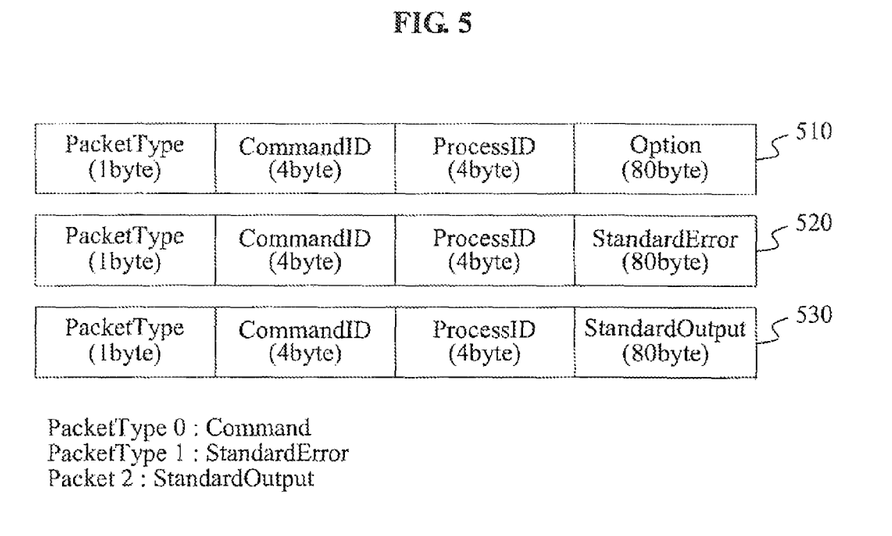
FIG. 5 is a diagram to describe a format of a communication protocol between a debugger server and a debugger client according to an embodiment of the present invention.

FIG. 5 is a diagram to describe a format of a communication protocol between a debugger server and a debugger client according to an embodiment of the present invention.

A format of a packet 510 transmitted from the debugger client to the debugger server to make a request for a process execution and a debugging service may include a packet type (PacketType), a command identifier (CommandID), a process ID (ProcessID), and option information (Option). When a debugging result is classified into a standard error, a format of a packet 520 transmitted from the debugger server to the debugger client to inform about the debugging result of remote software may include PacketType, CommandID, ProcessID, and a standard error value (StandardError). When the debugging result is classified into a standard output, a format of a packet 530 may include PacketType, CommandID, ProcessID, and a standard output value (StandardOutput).

The web-based software debugging method according to the above-described exemplary embodiments of the present invention may be recorded in computer-readable media including program commands to implement various operations embodied by a computer. The media may also include, alone or in combination with the program commands, data files, data structures, and the like. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

The invention claimed is:

1. A web-based software debugging apparatus, comprising:
    a web interface to communicate with a web browser executed by a user on a user computer; wherein the web interface enables the user of the web browser to make a request for a debugging service for software, the debugging service and software both performed in a remote target system, and to verify a debugging result of the software;
    a debugger client to receive the debugging service request for the software via the web interface, and to provide the debugging result to the web interface; and,
    a debugger server on a host computer to receive the debugging service request from the debugger client, transmit the debugging service request through a connection to the target system, receive the debugging result from the target system and to transmit the debugging result to the debugger client;
    wherein the web interface and debugger client are implemented on the user computer or on the host computer;
    wherein the web interface only communicates with the remote target via the debugger server;
    wherein the debugger server comprises: a server manager to receive the debugging service request from the debugger client, and to receive the debugging result from the target system; an information converter manager to convert the debugging service request and the debugging result to a format of a command used in a GNU Source-Level Debugger (GDB); and a process controller to drive the GDB for a general control associated with debugging of the software according to the converted command; and
    wherein the information converter manager comprises: a command converter to convert the debugging service request to the format of the command used in the GDB; a standard error converter to process a standard error according to the debugging result; a standard output converter to process a standard output according to the debugging result; and a result analyzer to transfer a processing result of the standard error or the standard output to the server manager.

2. The apparatus of claim 1, wherein the debugger client comprises: a debugging interface to manage an information exchange with the user; and a debugger client manager to manage a connection to the debugger server using a serial communication or a Transmission Control Protocol/Internet Protocol (TCP/IP) communication.

3. The apparatus of claim 1, wherein the debugger server sets up a communication path with the target system using a serial communication or a TCP/IP communication that is not connected to the debugger client.

4. The apparatus of claim 1, wherein the server manager comprises: a network manager to manage an information exchange between the debugger client and the target system; a process manager to transmit, to the debugger client, the debugging result according to driving of the GDB.

5. The apparatus of claim 1, wherein the process controller comprises: a transmission controller to receive the command converted by the information converter manager; a process executor to analyze a message type of the received command; and a reception controller to transmit the analyzed message type to the information converter manager.

6. A web-based software debugging method of a debugging apparatus comprising a web interface, a debugger client, and a debugger server, the method comprising:
    receiving, by the web interface, a debugging service request of a user executing a web browser on a user computer, for debugging software performed in a remote target system via the web browser;
    transmitting, by the debugger client, the debugging service request to the debugger server that is implemented on a host computer system;
    transmitting the debugging service request from the debugging server through a connection to the target system to perform the debugging request on the software in the target system;
    wherein the web interface and debugger client are implemented on the user computer or on the host computer;
    wherein the web interface only communicates with the remote target via the debugger server; and
    wherein: the debugging of the software comprises transmitting a debugging service request message to the target system to drive a GDB according to the debugging service request, and the target system debugs the software according to driving of the GDB and then transmits a debugging result of the software to the debugger server using a standard error and a standard output.

7. The method of claim 6, further comprising: transmitting, by the debugger server, a debugging result of the software to the debugger client; and providing, by the debugger client, the user with the debugging result that is received from the debugger server.

8. The method of claim 6, wherein the transmitting of the debugging service request comprises setting up a communication path with the debugger server using a serial communication or a TCP/IP communication that is not connected to the debugger client.

9. The method of claim 6, wherein the debugging of the software comprises setting up a communication path with the target system using a serial communication or a TCP/IP communication.

10. The method of claim 6, wherein the transmitting of the debugging service request comprises: requesting the debugger server for a connection for a debugging service when the web browser is executed; requesting the debugger server for the connection to the target system when a response packet for a connection success for the debugging service is received from the debugger server; and transmitting the debugging service request to the debugger server when a response packet for a connection success to the target system is received from the debugger server.

11. A non-transitory computer-readable recording medium storing a program to implement the method according to claim 6.

* * * * *